US008962128B2

(12) United States Patent
Vincent-Beguin et al.

(10) Patent No.: US 8,962,128 B2
(45) Date of Patent: Feb. 24, 2015

(54) NONWOVEN SUBSTRATE FOR JOINT TAPE AND JOINT TAPE THAT IS DIMENSIONALLY STABLE AND FOLDABLE WITHOUT LOSING MECHANICAL STRENGTH CONTAINING SAID SUBSTRATE

(75) Inventors: Audrey Vincent-Beguin, Venissieux (FR); Didier Bigot, Le Champ Pres Froges (FR); Noel Cartier, Jardin (FR); Patrice Blanc, Saint-Genis Laval (FR); Bertrand Rupin, Grenoble (FR); Jean-Michel Santarella, Vienne (FR)

(73) Assignee: Ahlstrom Corporation, Helsinki (FI)

( * ) Notice: Subject to any disclaimer, the term of this patent is extended or adjusted under 35 U.S.C. 154(b) by 0 days.

(21) Appl. No.: 13/514,130

(22) PCT Filed: Nov. 29, 2010

(86) PCT No.: PCT/FI2010/050977
§ 371 (c)(1),
(2), (4) Date: Oct. 19, 2012

(87) PCT Pub. No.: WO2011/070233
PCT Pub. Date: Jun. 16, 2011

(65) Prior Publication Data
US 2013/0078442 A1 Mar. 28, 2013

Related U.S. Application Data

(60) Provisional application No. 61/285,142, filed on Dec. 9, 2009.

(30) Foreign Application Priority Data

Dec. 7, 2009 (FR) ...................................... 09 58681

(51) Int. Cl.
| | |
|---|---|
| B32B 5/02 | (2006.01) |
| C09J 7/02 | (2006.01) |
| C09J 7/04 | (2006.01) |
| D04H 1/42 | (2012.01) |
| D04H 1/4218 | (2012.01) |
| D04H 1/4266 | (2012.01) |
| D04H 1/435 | (2012.01) |
| D04H 1/58 | (2012.01) |
| D04H 1/587 | (2012.01) |
| D04H 13/00 | (2006.01) |
| D04H 1/425 | (2012.01) |
| D04H 1/4374 | (2012.01) |
| D04H 1/4382 | (2012.01) |
| E04F 21/165 | (2006.01) |
| B32B 5/08 | (2006.01) |
| B32B 5/26 | (2006.01) |

(Continued)

(52) U.S. Cl.
CPC ................ *B32B 5/02* (2013.01); *C09J 7/0296* (2013.01); *C09J 7/04* (2013.01); *D04H 1/42* (2013.01); *D04H 1/4218* (2013.01); *D04H 1/4266* (2013.01); *D04H 1/435* (2013.01); *D04H 1/58* (2013.01); *D04H 1/587* (2013.01); *D04H 13/00* (2013.01); *D04H 13/002* (2013.01); *D04H 1/425* (2013.01); *D04H 1/4374* (2013.01); *D04H 1/4382* (2013.01); *E04F 21/165* (2013.01); *B32B 5/08* (2013.01); *B32B 5/26* (2013.01); *B32B 7/02* (2013.01); *C09J 2400/263* (2013.01); *B32B 2260/023* (2013.01); *B32B 2262/02* (2013.01); *B32B 2262/0276* (2013.01); *B32B 2262/065* (2013.01); *B32B 2262/067* (2013.01); *B32B 2262/14* (2013.01); *B32B 2307/734* (2013.01); *B32B 2405/00* (2013.01); *B32B 2581/00* (2013.01); *E04F 13/042* (2013.01)
USPC ........... 428/219; 442/149; 442/415; 442/385; 428/340

(58) Field of Classification Search
USPC ............. 442/149, 327, 1, 136, 144, 151, 181, 442/187, 286, 304, 330, 385, 415, 58, 64, 442/70, 77, 381, 414, 389, 59, 138, 361, 442/394, 104, 124, 131, 132, 139, 140, 141, 442/146, 147, 199, 2, 20, 289, 301, 302, 442/311, 315, 35, 370, 386, 391, 392, 42, 442/61; 156/304.3
See application file for complete search history.

(56) References Cited

U.S. PATENT DOCUMENTS

| | | | |
|---|---|---|---|
| 4,983,256 A | 1/1991 | Combette et al. | |
| 5,354,606 A * | 10/1994 | Kjelby et al. | ................. 442/321 |

(Continued)

FOREIGN PATENT DOCUMENTS

| | | |
|---|---|---|
| CN | 1788130 | 6/2006 |
| DE | 37 10 498 | 10/1988 |
| DE | 3710498 A * | 10/1988 |

(Continued)

OTHER PUBLICATIONS

International Search Report for PCT/FI2010/050977, mailed Feb. 25, 2011.
France Search Report for FR Application No. 0958681, dated Feb. 11, 2010.
First Search Report, CN Appln. No. 201080055781.4 filed Nov. 29, 2010 (Dec. 27, 2013).

(Continued)

*Primary Examiner* — Aaron Austin
*Assistant Examiner* — Jasper Saberi
(74) *Attorney, Agent, or Firm* — Nixon & Vanderhye P.C.

(57) ABSTRACT

Nonwoven substrate for joint tape containing vegetable fibers from softwood or hardwood pulp, possibly with synthetic fibers and/or possibly glass fibers, characterized in that it also contains flax fibers obtained by retting. Joint tape including the substrate.

10 Claims, No Drawings

(51) Int. Cl.
  *B32B 7/02* (2006.01)
  *E04F 13/04* (2006.01)

(56) References Cited

U.S. PATENT DOCUMENTS

2003/0181114 A1* 9/2003 Newton et al. ................ 442/149
2008/0139064 A1* 6/2008 Neill et al. .................... 442/149

FOREIGN PATENT DOCUMENTS

| DE | 42 42 538 | 6/1993 |
| EP | 0 336 842 | 10/1989 |
| EP | 1 588 815 | 10/2005 |
| FR | 2 705 369 | 11/1994 |
| WO | 94/26965 | 11/1994 |
| WO | WO 2008/073206 | 6/2008 |
| WO | WO 2008084139 A1 * | 7/2008 |

* cited by examiner

NONWOVEN SUBSTRATE FOR JOINT TAPE AND JOINT TAPE THAT IS DIMENSIONALLY STABLE AND FOLDABLE WITHOUT LOSING MECHANICAL STRENGTH CONTAINING SAID SUBSTRATE

This application is the U.S. national phase of International Application No. PCT/FI2010/050977, filed 29 Nov. 2010, which designated the U.S. and claims priority to France Application No. 0958681, filed 7 Dec. 2009, and claims the benefit of U.S. Provisional Application No. 61/285,142, filed 9 Dec. 2009, the entire contents of each of which are hereby incorporated by reference.

The subject of the invention is a nonwoven substrate for joint tape. It also concerns joint tape containing said substrate, said joint tape being dimensionally stable and foldable without losing mechanical strength.

In a known manner, joint tape is designed to be applied between two panels, notably drywall, to ensure continuity. Such drywall panels can be used on walls and on ceilings, outside or inside. They can be applied in damp rooms such as bathrooms or in dry rooms.

Several kinds of joint tape have been described.

First of all, there is joint tape made of kraft paper strips. In practice, the user applies a first layer of joint compound to the joint between the two panels, upon which the joint tape is then positioned. While drying, the joint tape absorbs moisture from the joint compound, causing it to shrink crosswise, lengthwise and in thickness, thus forming cracks. A second layer of joint compound therefore has to be applied, and often a third layer, in order to eliminate all risk of cracking.

To reinforce dimensional stability crosswise and lengthwise, it has been proposed that glass fibres and synthetic fibres be combined with the paper cellulose fibres at a high proportion of up to 40% by weight, or more, of the fibre weight. Such joint tapes include, for example, those described in the document WO2008/073206A1. The nonwoven substrates thus obtained have dimensional stability that is considered satisfactory for the planned application. Using them in corners is delicate, however, given that the glass fibres contained in the substrate break when folding the tape and when breaking the fold with a spatula.

Joint tape substrates made of nonwoven glass fibres or glass netting are also well known. The first have low breaking strength. The second, on the other hand, have high breaking strength but have the disadvantage of a risk of crack formation on the coating applied.

In other words, the problem that the invention proposes to solve is the development of a joint tape that is dimensionally stable crosswise, lengthwise and in thickness and whose mechanical strength before and after folding is optimal.

To do this, the Applicant has developed a substrate for joint tape containing vegetable fibres from softwood or hardwood pulp, possibly in the presence of synthetic fibres and/or possibly glass fibres. According to an essential characteristic, the nonwoven substrate also contains flax fibres obtained by retting.

Flax fibres obtained by retting can be clearly distinguished from flax fibres from flax pulp. The first can be called "textile fibres" or "unpulped fibres", while the second can be called "paper fibres" or "pulp fibres". The retting technique is a technique used to retrieve fibres directly from the whole plant before transforming it into a pulp. These fibres are characterised by a larger diameter and size than fibres obtained from pulp during the papermaking process. The flax fibres according to the invention may be combed or uncombed.

The Applicant has in fact observed that, quite surprisingly, the presence of textile flax fibres in the substrate solves the problem of breaking strength crosswise after folding and lengthwise.

Vegetable fibres from softwood or hardwood pulp may be raw fibres or bleached fibres from chemical or mechanical paper pulp.

The synthetic fibres may be chosen from the group including polyester, polyethylene, polypropylene, polyamide, polyvinyl chloride, polyvinyl alcohol, acrylic and nylon fibres.

The substrate of the invention can be in the form of a single-layer substrate, a two-layer substrate or more largely a multi-layer substrate. If a two-layer substrate is used, it may be made with all the techniques known to the person skilled in the art, notably by running the preformed upper and lower sheets through a size press.

If a single-layer substrate is used, the flax fibres account for at least 30% by weight of the total fibres, and advantageously between 40 and 50%.

Likewise, vegetable fibres from softwood or hardwood pulp in practice account for at least 30%, and advantageously 40%, by weight of the fibre mixture.

At the same time, synthetic fibres, where used, advantageously account for at least 10% by weight of the fibre mixture.

According to another characteristic, the mass of the single-layer substrate is between 50 and 120 $g/m^2$, and advantageously between 70 and 100 $g/m^2$.

If a two-layer substrate is used, the aforementioned proportions concerning the fibres are the same, but in relation to the weight of the fibres comprising the lower layer only. In this case, the fibres comprising the upper layer are advantageously only vegetable fibres from softwood or hardwood pulp. The mass of the upper layer is advantageously between 5 and 30 $g/m^2$, preferably between 10 and 20 $g/m^2$. The mass of the lower layer is preferably equal to the value of the mass of the aforementioned single-layer substrate.

In a particular embodiment, the single-layer substrate has the following fibre composition (by fibre weight):

| | |
|---|---|
| vegetable fibres from softwood or hardwood pulp | 35 to 45% |
| glass fibres | 25 to 35% |
| textile flax fibres | 25 to 35% |

In another embodiment, the two-layer substrate has the following fibre composition (by fibre weight):

| Lower layer: | |
|---|---|
| vegetable fibres from softwood or hardwood pulp | 35 to 45% |
| polyester fibres | 10 to 20% |
| textile flax fibres | 40 to 50% |
| Upper layer: | |
| vegetable fibres from softwood or hardwood pulp | 100% |

In another embodiment, the two-layer substrate has the following fibre composition (by fibre weight):

| Lower layer: | |
|---|---|
| vegetable fibres from softwood or hardwood pulp | 35 to 45% |
| glass fibres | 25 to 35% |
| textile flax fibres | 25 to 35% |
| Upper layer: | |
| vegetable fibres from softwood or hardwood pulp | 100% |

The fibres are, of course, bound together by a binding agent chosen from among the natural or synthetic binders known to the person skilled in the art. In practice, the binding agent is chosen from the group including vinyl acetate, vinyl alcohol, vinyl chloride, acrylic acid, ethyl vinyl acetate, ethyl vinyl chloride, starch and starch derivatives. The binder is added to the substrate at 15 to 40 g/m², and advantageously at 20 to 30 g/m².

The invention also concerns joint tape containing the nonwoven substrate as described above with an adhesive layer on one side.

The invention and the advantages it provides can be better understood through the following examples of embodiment.

Substrates for joint tape are prepared according to the invention in single-layer and two-layer forms (trials 1-4). The mechanical strength of the substrate is measured before and after folding according to the following test:

Folding the Sample

The sample is first placed between the 100 mm×20 mm jaws of an embossing machine; a metal jaw with a raised flute, and a flat jaw with Teflon coating. The sample is placed under 7 bars of pressure for 7 seconds. The flute is situated longitudinally on the sample. The sample is then folded manually so that the 2 sides are folded together on the side opposing the embossed side. The fold is then flattened by rolling a 1-kg roller on the sample. To flatten the two sides against each other perfectly, another 10-kg roller is rolled over the fold twice.

Mechanical Measurement

A dynamometer with a 20-mm space between the jaws is used. The sample is 15 mm wide and at least 40 mm long. The fold is placed perpendicular to the direction of pull. A 25 mm/min pull is applied with a 500-N sensor, and the device records tensile strength, a measurement given in kN/m. The test is repeated 10 times to calculate an average value as well as a standard deviation.

Mechanical strength after folding is considered satisfactory starting at a value of 25 lb/in.

All the results can be found in the following table: the "Ref" trial corresponds to the two-layer paper, reference 7136, tested in document WO2008/073206A1, which does not contain flax fibres.

| | PROTOTYPES | | | | | | MAIN PROPERTIES Mechanical strength crosswise after folding | | | |
|---|---|---|---|---|---|---|---|---|---|---|
| | UPPER LAYER | | LOWER LAYER | | BINDER | TOTAL | Flat | | Folded | |
| ID | g/m² | Composition | g/m² | Composition | g/m² | g/m² | Average | +/- | Average | +/- |
| Ref | 15 | 50% softwood paper pulp 50% hardwood paper pulp | 49 | 45% softwood paper pulp 44% glass 11% polyester | 21 | 85 | 26 | 4 | 19 | 2 |
| 1 | 15 | 50% softwood paper pulp 50% hardwood paper pulp | 49 | 40% softwood paper pulp 44% flax 16% polyester | 26 | 90 | 33 | 6 | 32 | 4 |
| 2 | | No upper layer | 66 | 40% softwood paper pulp 30% glass 30% flax | 27 | 93 | 30 | 5 | 26 | 3 |
| 3 | 15 | 50% softwood paper pulp 50% hardwood paper pulp | 51 | 40% softwood paper pulp 30% glass 30% flax | 28 | 94 | 31 | 5 | 29 | 3 |
| 4 | 14 | 50% softwood paper pulp 50% hardwood paper pulp | 46 | 40% softwood paper pulp 30% glass 30% flax | 22 | 82 | 30 | 3 | 25 | 3 |

Glass fibre: 11 μm, 4 or 6 mm, by Owens Corning
Polyester fibres: Dacron 1.7 or 6.7 dtex, 12 mm, by ADVANSA
Textile flax fibres by VAN ROBAEYS, scutched, cut to 12 mm, uncombed As the table shows, the presence of textile flax fibres with or without glass fibres in a single layer or two layers provides satisfactory mechanical strength after folding compared with a Ref paper that does not contain flax fibres.

The invention claimed is:

1. A nonwoven substrate for joint tape comprising:
   (a) a fibrous mixture comprised of, based on total weight of fibres in the substrate, (i) at least 30% by weight of vegetable fibres from softwood or hardwood pulp, (ii) at least 10% by weight of synthetic fibres selected from the group consisting of polymeric fibres and glass fibres, and (iii) at least 30% by weight of retted flax textile fibres, and
   (b) a binding agent in an amount of 15 to 40 g/m² to bind the fibres of the fibrous mixture together.

2. The nonwoven substrate as claimed in claim 1, wherein the substrate has a single layer and a mass between 50 and 120 g/m².

3. The nonwoven substrate as claimed in claim 1, wherein the substrate comprises an upper layer and a lower layer, and wherein the fibres of the upper layer consist of vegetable fibres from softwood or hardwood pulp.

4. The nonwoven substrate as claimed in claim 1, wherein the substrate comprises an upper layer and a lower layer, wherein
   (a) the lower layer is comprised of (1) a fibrous mixture of (i) 35 to 45% by weight of the vegetable fibres from softwood or hardwood pulp; (ii) 10 to 20% by weight of polyester fibres; and (iii) 40 to 50% by weight of the retted flax textile fibres; and (2) the binding agent, and wherein
   (b) the upper layer is comprised of 100% by fibre weight of the vegetable fibres from softwood or hardwood pulp.

5. The nonwoven substrate as claimed in claim 1, wherein the substrate comprises an upper layer and a lower layer, wherein
   (a) the lower layer is comprised of (1) a fibrous mixture of (i) 35 to 45% by weight of the vegetable fibres from softwood or hardwood pulp; (ii) 25 to 35% by weight of polyester fibres; and (iii) 25 to 35% by weight of the retted flax textile fibres; and (2) the binding agent, and wherein
   (b) the upper layer is comprised of 100% by fibre weight of the vegetable fibres from softwood or hardwood pulp.

6. The nonwoven substrate as claimed in claim 1, wherein the vegetable fibres from softwood or hardwood pulp are present in an amount of at least 40% by weight based on the total weight of fibres in the substrate.

7. The nonwoven substrate as claimed in claim 2, wherein the substrate has a mass between 70 and 100 g/m$^2$.

8. The nonwoven substrate as claimed in claim 1, wherein the binding agent is present in an amount of 20 to 40 g/m$^2$.

9. The nonwoven substrate as claimed in claim 1, wherein the binding agent is selected from the group including vinyl acetate, vinyl alcohol, vinyl chloride, acrylic acid, ethyl vinyl acetate, ethyl vinyl chloride, starch and starch derivatives.

10. Joint tape comprising a nonwoven substrate as claimed in claim 1, and an adhesive layer on one side of the substrate.

* * * * *